(12) United States Patent
Barrett

(10) Patent No.: US 6,892,692 B2
(45) Date of Patent: May 17, 2005

(54) ROTARY PISTON ENGINE AND METHOD OF OPERATION

(75) Inventor: Eric Barrett, Kinnelon, NJ (US)

(73) Assignee: Alternative Power, Booton, NJ (US)

(*) Notice: Subject to any disclaimer, the term of this patent is extended or adjusted under 35 U.S.C. 154(b) by 225 days.

(21) Appl. No.: 09/963,460

(22) Filed: Sep. 27, 2001

(65) Prior Publication Data

US 2002/0170529 A9 Nov. 21, 2002

Related U.S. Application Data

(60) Provisional application No. 60/235,564, filed on Sep. 27, 2000.

(51) Int. Cl.[7] .............................................. F02B 53/10
(52) U.S. Cl. ..................................... 123/205; 418/61.2
(58) Field of Search .................................. 123/205, 206, 123/208, 210, 241, 242, 219, 299, 196 R; 418/61.2

(56) References Cited

U.S. PATENT DOCUMENTS

| | | | |
|---|---|---|---|
| 3,136,302 A | * 6/1964 | Nallinger et al. | 123/208 |
| 3,344,778 A | * 10/1967 | Bensinger | 123/208 |
| 3,923,012 A | * 12/1975 | Jones et al. | 123/205 |
| 4,037,412 A | 7/1977 | Jones | 123/206 |
| 4,100,911 A | 7/1978 | Kromer | 123/205 |
| 4,660,517 A | * 4/1987 | Fujimoto et al. | 123/210 |
| 4,969,429 A | * 11/1990 | Bartel et al. | 123/196 R |
| 5,094,204 A | 3/1992 | King | 123/205 |
| 5,251,596 A | * 10/1993 | Westland | 123/242 |
| 5,944,499 A | * 8/1999 | Morita | 418/61.2 |
| 6,158,992 A | * 12/2000 | Morita | 418/61.2 |
| 6,322,334 B1 | 11/2001 | Klipstein | |

FOREIGN PATENT DOCUMENTS

| | | | | |
|---|---|---|---|---|
| JP | 06280600 A | * 10/1994 | | F02B/53/02 |
| JP | 06280601 A | * 10/1994 | | F02B/53/10 |

* cited by examiner

Primary Examiner—Thomas Denion
Assistant Examiner—Thai-Ba Trieu
(74) Attorney, Agent, or Firm—Finnegan, Henderson, Farabow, Garrett & Dunner, L.L.P.

(57) ABSTRACT

The present invention relates to a design and method of operation of an improved rotary piston engine. In particular, a preferred embodiment of the present invention is directed to a rotary engine with improved reliability, comprising a housing, having side portions and a peripheral portion defining a chamber, a rotor, disposed within the chamber, and at least one exhaust port in one of the side portions.

34 Claims, 11 Drawing Sheets

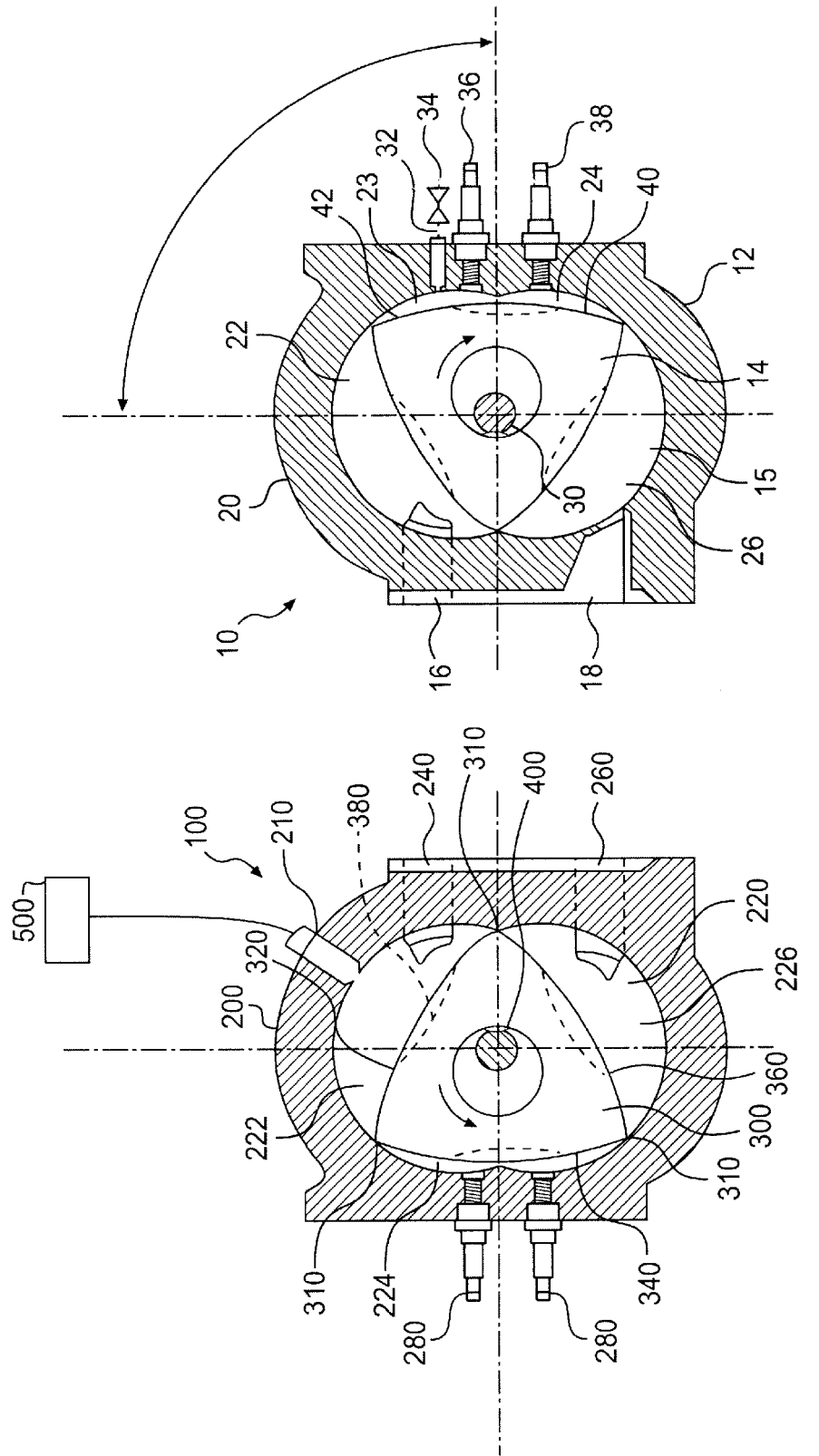

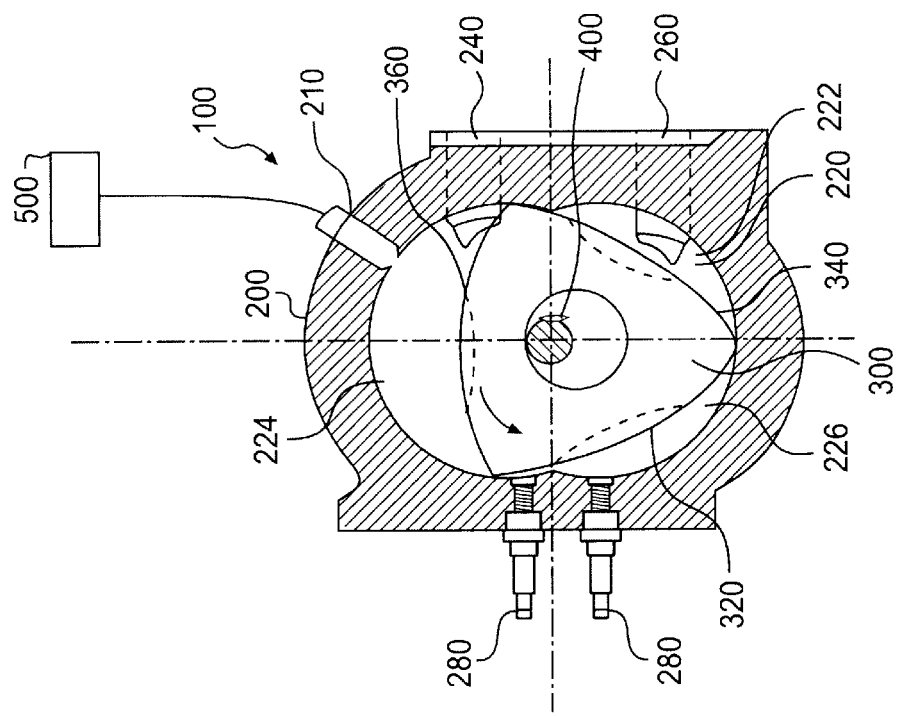
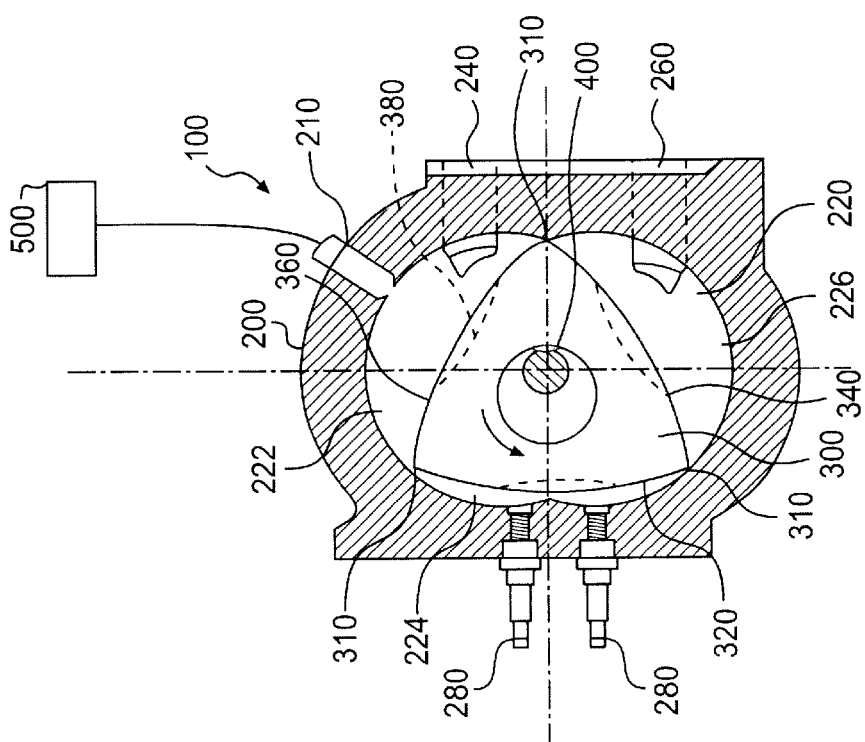

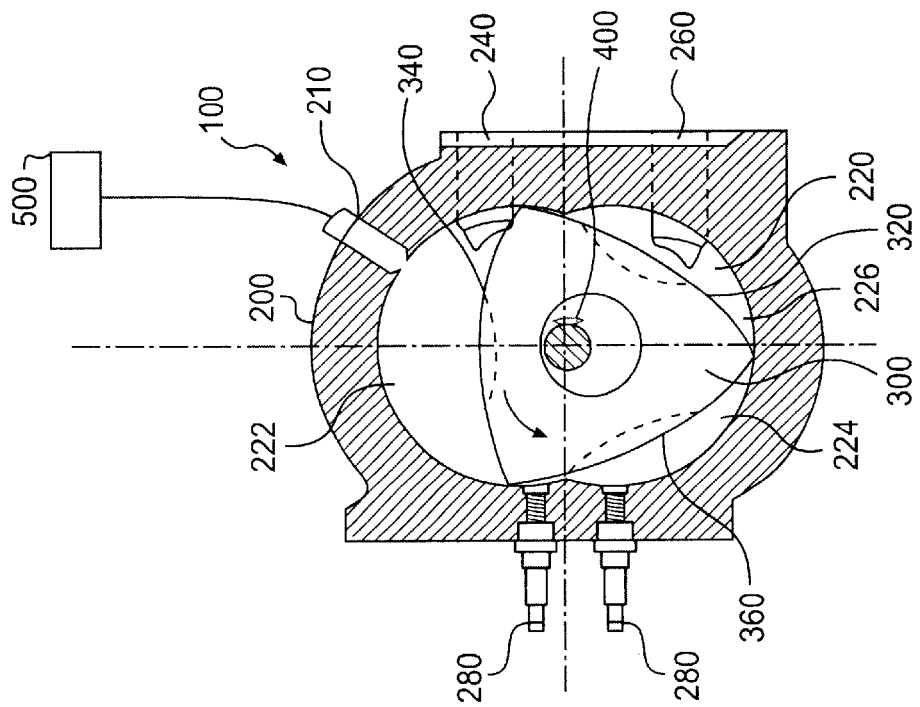
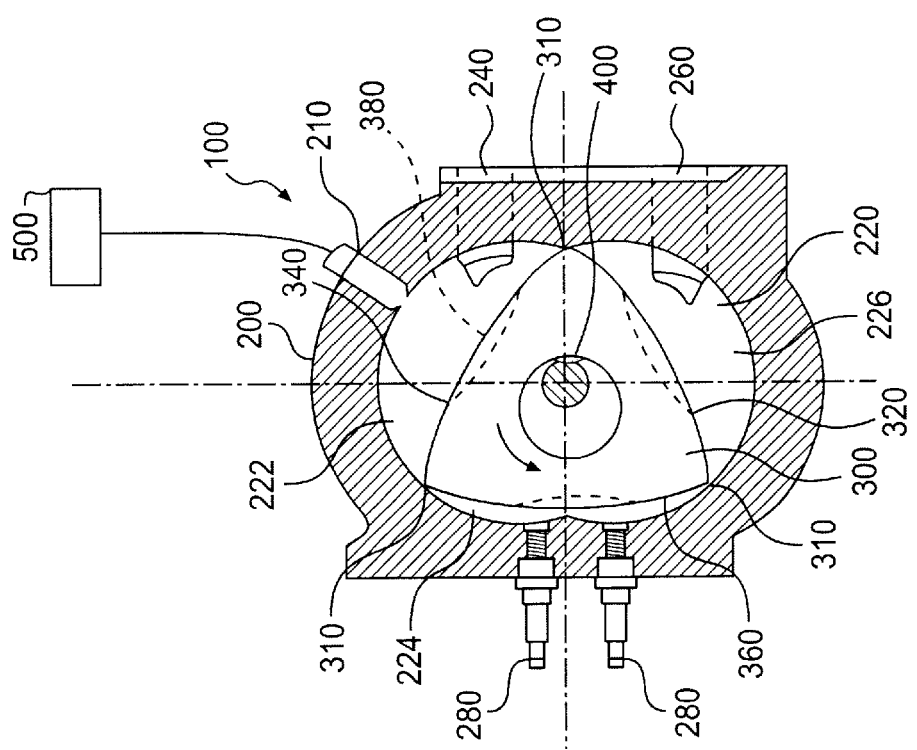

| RPM | TORQUE | HP | TIME | RECS |
|---|---|---|---|---|
| 0 | 7 | 0 | 0:20.430 | 148 |
| 3300 | 89 | 56 | 0:02.000 | 149 |
| 3400 | 92 | 60 | 0:02.413 | 82 |
| 3600 | 93 | 62 | 0:02.735 | 49 |
| 3700 | 96 | 69 | 0:03.270 | 46 |
| 3800 | 104 | 76 | 0:03.690 | 83 |
| 3900 | 115 | 86 | 0:04.380 | 127 |
| 4000 | 122 | 94 | 0:05.190 | 90 |
| 4100 | 131 | 103 | 0:06.045 | 129 |
| 4200 | 134 | 108 | 0:06.865 | 93 |
| 4300 | 138 | 112 | 0:07.080 | 54 |
| 4400 | 139 | 115 | 0:07.415 | 54 |
| 4500 | 142 | 122 | 0:07.665 | 30 |
| 4600 | 145 | 128 | 0:07.960 | 50 |
| 4700 | 152 | 137 | 0:08.258 | 40 |
| 5100 | 190 | 187 | 0:09.136 | 44 |
| 5200 | 204 | 204 | 0:09.505 | 71 |
| 5300 | 218 | 220 | 0:10.606 | 149 |
| 5900 | 232 | 262 | 0:12.810 | 116 |
| 6000 | 228 | 262 | 0:13.155 | 50 |
| 6300 | 224 | 271 | 0:13.855 | 46 |
| 6400 | 226 | 275 | 0:14.135 | 36 |
| 6600 | 221 | 280 | 0:14.740 | 56 |
| 6700 | 216 | 277 | 0:15.205 | 72 |
| 7100 | 200 | 272 | 0:16.105 | 32 |
| 7200 | 193 | 264 | 0:16.388 | 37 |
| 7400 | 193 | 274 | 0:16.388 | 50 |
| 7900 | 194 | 293 | 0:17.985 | 54 |

*FIG. 5b*

ROTARY PISTON ENGINE AND METHOD OF OPERATION

CROSS REFERENCE TO RELATED APPLICATIONS

The present invention relates to and claims priority on U.S. Provisional Application Ser. No. 60/235,564, filed on Sep. 27, 2000.

FIELD OF THE INVENTION

The present invention relates to a design and method of operation of an improved rotary piston engine. The engine of the present invention achieves higher performance (high torque and high horsepower), higher fuel efficiency, and lower emissions, in a lighter weight engine package, relative to prior known engines and methods of internal combustion engine management. The engine and method of the present invention are applicable to a wide variety of fuels and applications, including but not limited to automotive, racing, supplemental power, and various industrial uses. In particular, the invention may include any one or more of the following enhancements or features: side port exhaust; direct fuel injection; fully stratified charge; variable fuel injector timing; and various ignition and/or fuel regimes.

BACKGROUND OF THE INVENTION

Rotary engine designs were known as early as 1588, following the development of a rotary engine design by Ramelli. Various rotary engine designs were proposed during the late 1800's following the development of the four stroke, Otto engine cycle in 1876. Rotary engine designs enjoyed popularity in aviation applications at the time of World War I. These engines were primarily air-cooled, with cylinders arranged radially around a crankshaft that was fastened to the fuselage. Various inefficiencies in these designs, however, led to their abandonment after the First World War. Prior to 1910, sources report that more than 2,000 patents had been filed for rotary engine designs. Felix Wankel catalogued over 862 rotary engine configurations, of which more than 500 represented potentially feasible engine designs.

Following Wankel's development of various rotary engine designs, Curtiss-Wright licensed rotary engine technology from Wankel GmbH in 1958. Curtiss-Wright began an aggressive research program into the various applications of rotary engine designs, including automotive, and other applications. Curtiss-Wright, however, did not develop a commercially viable rotary engine design. Instead, in 1984, Curtiss-Wright sold its rotary engine division to John Deere. Deere proceeded to do additional research on stratified charge, rotary engines. As a result of these development efforts, Deere developed a 400 HP rotary engine, in cooperation with Lycoming by the 1980s. Nonetheless, this design required a heavy turbocharger and did not perform well at altitude. (The low atmospheric pressures impaired the turbocharger's performance.) By the late 1980's Lycoming canceled its development work on stratified charge, rotary engine designs.

Numerous engine manufacturers and automotive companies have attempted to develop commercial rotary engine designs including: Curtiss Wright; John Deere Rotary Power International; Mazda; NSU (in Germany); Audi; General Motors; Ford; Daimler-Benz; and Nissan. With the exception of Mazda, each has tried and failed to achieve a commercially successful rotary engine design.

The rotary engine was first used in automotive applications in 1958. Mazda has successfully commercialized various rotary engine designs for automotive applications. The Wankel design, employed by Mazda, is the most fully developed and widely used rotary engine design. Mazda has produced rotary engine units for use in automotive applications. The peak rpm of production Mazda rotary engines is about 8000 rpms. The present inventor believes that the improved rotary engine of the present invention may operate at peak rpm up to about 10,000 rpm, while providing improved engine reliability and efficiency.

In general, most rotary engines involve a design in which the combustion chambers and cylinders rotate with a driven shaft around a fixed control shaft to which the pistons are attached. The pistons rotate around the control shaft. For example, in the Wankel engine, the rotor is designed as an equilateral triangle. The rotor rotates in a specially shaped casing to form three crescent shaped combustion chambers between the convex outer sides of the rotor and the concave inner walls of the casing. Each apex of the rotor is provided with a seal, which separates each combustion chamber from the others. Typically the seals are spring loaded into the edges of the rotor to maintain a pressure-proof seal between the rotor and the casing. The seals maintain continuous sliding contact with the concave inner surface of the casing. As the rotor turns, the combustion chambers progressively increase and decrease in size.

As in a conventional four stroke reciprocating piston engine, a fuel charge enters through an injector system (in a fuel injected design) or an intake port (in a design incorporating a carburetor or port injection). The fuel charge is compressed as the combustion chamber is reduced in size as the rotor turns. The compressed fuel charge is ignited at an appropriate time and expands, providing power to the crankshaft as the combustion chamber expands. The combusted gasses are then exhausted from the engine as the combustion chamber again is reduced in size, forcing the gasses out through an exhaust port.

Unlike a reciprocating piston engine, which typically takes four strokes of the piston (two complete rotations of the crankshaft in a four stroke engine) to accomplish these four stages, each face—combustion chamber—of a typical rotary engine progresses through the strokes of intake, compression, expansion, and exhaust in a single rotation of the crankshaft.

Rotary engine designs offer substantial advantages in terms of simplicity, and reduced weight and size. Prior to the present invention, development of a high performance rotary engine has been prevented by various factors. Although numerous researchers have attempted to improve the performance of rotary engine designs, those efforts of which the present inventor is aware have failed to achieve the performance levels that the Applicant has obtained by the present invention. This situation continues to exist, in spite of the aggressive effort and substantial amount of time and energy devoted to development of improved rotary engine designs throughout this century. Accordingly, there remains a long-felt, and unresolved need for an improved design and method of management of a rotary engine that would achieve the benefits and advantages of the present invention.

There are a number of reasons why prior developers appear to have failed to improve rotary engine design to the levels of the present invention. Although some prior workers recognized that the rotor spins at a different speed than the crankshaft, these prior workers apparently failed to account for this difference in rotation speeds by adjusting the timing of fuel injection and ignition as a function of engine speed. For example, in one embodiment of the present invention based upon a modified Mazda 13B engine, three injector events occur during each revolution of the rotor, one for each chamber. The rotor spins at 2,000 rpm while the crankshaft spins at 6,000 rpm. Yet, in most prior applications, the timing has been driven from the crankshaft as a fixed timing system. Moreover, although the rotational speed of the crankshaft is substantially constant at a given engine rpm, the angular speed of the rotor tip is not. Prior designs have failed, apparently, to account for the effect of these differences on engine injection and ignition timing at different engine rpms.

The recession of the rotor relative to the crankshaft makes it desirable to employ variable injector timing as a function of engine, and rotor, speed. No one, of whom the present inventor is aware, prior to the present invention has achieved direct fuel injection, with fully stratified charge and variable injector timing, to produce the improved performance of the present invention.

Prior attempts to modify injector timing have advanced the injector timing. For example, most prior attempts of which the present inventor is aware advance the injector timing 45° to 65° degrees before top dead center, a point at which there is overlap between combustion chambers. The present inventor has discovered that modifying injection timing as a function of speed, namely, advancing the injector timing when the crankshaft speed increases and retarding timing as when crankshaft speed decreases, improves performance. These advances were not disclosed by prior researchers in the field. The present invention will also improve the performance of direct injection four stroke engines. In particular, the inventor has discovered a method of managing the engine to enhance performance by managing the injector timing—by advancing or retarding injector timing to optimize performance.

The present inventor has found that it is preferable to advance injector timing as a function of engine speed. Specifically, in a preferred embodiment of the present invention, fuel injection timing is modified to begin after the intake means is substantially closed. In an injector of the type known prior to the present invention, the injector pulse rapidly slopes up to full flow, where it is maintained until flow stops abruptly. Fuel injection preferably is stopped prior to the leading edge of the piston coming into proximity with, or passing, the injector. Preferably, flow is stopped prior to the combustion chamber delivering sufficient pressure to cause back flow in the injector. Injector timing preferably is optimized between these two extremes. If injection occurs too early in the cycle, when air flow is not sufficiently turbulent, the fuel is not properly atomized and dispersed. If too late, the face of the piston at its trailing edge is wetted by fuel or fuel is distributed between the trailing edge of one combustion chamber and the leading edge of the next, resulting in loss of efficiency and power. These improvements were not disclosed by prior researchers in the field. The present inventor has found that the timing of fuel injection in a rotary engine has a major impact on engine performance in unexpected ways.

In 1992, King reported that "[i]n general rotary combustion engines have not been able to achieve brake thermal efficiencies as high as that of reciprocating engines. The two primary reasons for this lower efficiency are the rotary's large surface area-to-volume ratio of the combustion chamber and the long cycle time (1.5 times that of the reciprocating engine). Both these factors increase the amount of heat energy lost during combustion. The large surface area-to-volume ratio (a result of the long rectangular shaped chamber) also increases the time required to burn the mixture since the flame has farther to burn and increases the amount of unburned end gas in the combustion chamber. A lean fuel mixture is desirable because it facilitates high thermal efficiency, but at the same time it slows the burn rate which counteracts the benefits of lean burn efficiency."

King reported that "a method is needed which will allow the engine to operate at lean overall fuel-air ratios (to attain high thermal efficiency) while maintaining, or even increasing, the burning rate of the fuel. Ideally a stratified fuel charge which is rich near the spark plugs and lean around the perimeter of the chamber is desired. This will keep the initial burning rate high due to a rich local mixture around the spark plugs and eliminate the unburned gas near the edges of the chamber." The solution adopted by King, however, failed to resolve these issues. King, U.S. Pat. No. 5,094,204 for Stratified Charge Injection for Gas-Fueled Rotary Engines (Mar. 10, 1992), which is incorporated herein by reference, discloses a proposed design for a gas-fueled rotary engine. King is directed to a rotary combustion engine in which a gaseous fuel charge is injected into the chamber on compression, after the intake air port closes and early in the compression stroke, to achieve fuel-charge stratification. King reports that this approach is expected to provide the advantages of increased thermal efficiency and volumetric efficiency, reduced exhaust emissions levels, and less tendency to detonate than a homogeneous charged engine.

The approach employed by King teaches away from the present invention, in several ways. King injects only gaseous fuel, which King recognizes displaces intake air, reducing the air/fuel ratio and the apparent size (effective displacement) of the engine. In order to maintain displacement, King allows the fuel to enter the combustion chamber only after the intake port(s) have closed and the chamber is on compression. King injects the gaseous fuel in a manner, at a pressure, and at a location that seeks to avoid displacement of intake air and purportedly achieves charge stratification. Specifically, King reports that he anticipates this result by maintaining the injection pressure at a low pressure, relative to the maximum compression pressure in the combustion chamber, and injecting the fuel charge slowly over a period of time only after the intake valve is closed in order to achieve stratification of the charge. In this manner, King anticipates that the angle and depth of injection of the fuel into the chamber would be controlled. When the compression pressure increases to the level of the fuel supply pressure, injection of fuel is stopped.

King specifically teaches that the "fuel is injected far downstream of the air intake port." "The air turbulence caused by the intake port has substantially diminished and unidirectional air flow exists in the direction of the rotor rotation." King '204 patent, Col. 3, at ll. 49–54. King states explicitly, that "the exact location of the gaseous fuel injection is dependent upon the intake port timing of the specific engine, but in general is located in the rotor housing between 270° and 360° rotation of the rotor after compression top dead center, or between 810° and 1,080° rotation of the crankshaft, and in the middle of the width of the housing." King '204 patent, Col. 3, at ll. 6–11. King maintains the injector pressure well below the pressures achieved during compression and well below the levels at which fuel injectors of the type known in the art operate.

The present invention, in contrast, operates on a wide variety of fuels, including but not limited to gaseous fuels. Rather than reducing the injector pressure, constraining the size and flow rate of the injector, constraining the angle of the injector, and constraining the injector location to immediately before the spark plugs as did King, the present invention employs high- and low-pressure injectors, allows the injector configuration, disposition, and location to be varied depending on the application and desired results, and achieves fully stratified charge with direct fuel injection.

Based upon his experience with the present invention, the present inventor believes that the design disclosed and claimed by King does not perform as disclosed and claimed in the '204 patent. The present inventor believes that an engine made by the teachings of King would not achieve the performance advantages claimed by King, let alone of the present invention. King apparently did not run an actual engine to demonstrate the invention disclosed in King's '204 patent. Rather, King states that "a computer model was created and used to evaluate the present invention" and that the results disclosed were based upon "the modeling data." King '204 patent, Col. 4, ll. 3–4, and 35. King fails to observe or account for the timing changes observed in the present invention. There is no recognition in King that the rotor varies in speed at different points in its rotation around the crankshaft, nor is there any recognition of the phenomenon observed by the present inventor that in order to achieve the benefits of the present invention, injector timing should be varied at rpm. The present invention overcomes these failures of the prior known designs and methods to produce a high performance (high horsepower and high torque) engine, that achieves superior performance in terms of relatively high and flat horsepower and torque curves, higher fuel economy, lower emissions, improved emissions profile, and improved performance, relative to prior known engine designs and methods of engine management. For example, in laboratory scale testing on the present invention, the present invention has achieved superior performance at fuel efficiencies double that of prior known designs and methods of managing the engine. Further, the present design and method have achieved superior performance under conditions of air to fuel ratio that are considered to be so lean (from about 20:1 to about 60:1) that prior known designs would fail to perform.

The inventor believes that the present invention has achieved several types of results that would have been unexpected by persons of ordinary skill in the art. The invention achieves high performance in a small engine. The invention achieves a high and very desirable horsepower and torque. It does so while maintaining exhaust temperatures at lower levels than would have been anticipated. It achieves these results at an unexpectedly low level of fuel consumption. Emissions are reduced to levels below those that would have been expected for a rotary engine design. Further, the cost of the invention is unexpectedly low relative to prior known designs.

The invention achieves these advantages through a combination of several features, including various combinations of the following features: direct fuel injection; fully stratified charge; variable injector timing; high fuel pump pressures; side port exhaust; variable port timing (intake and/or exhaust); dual exhaust ports; high fuel injector pressures; and injection offset. In addition, various of these features may be employed in differing configurations of the invention, using various fuels, for a variety of end uses.

OBJECTS OF THE INVENTION

It is, therefore, an object of a preferred embodiment of the present invention to provide an improved design of a rotary piston engine.

Another object of a preferred embodiment of the present invention is to provide an improved direct injection rotary engine design and method of operation.

A further object of a preferred embodiment of the present invention is to provide an improved stratified charge rotary engine design and method of operation.

An additional object of a preferred embodiment of the present invention is to provide a method of management of a rotary piston engine that achieves improved performance relative to prior known engine designs and methods of operation.

Another object of a preferred embodiment of the present invention is to provide an improved rotary engine design that is capable of delivering improved performance in a variety of end-use applications.

Yet another object of a preferred embodiment of the present invention is to provide an improved rotary engine design and method of operation on a variety of fuels.

A further object of a preferred embodiment of the present invention is to provide a light weight design for a rotary piston engine.

Another object of a preferred embodiment of the present invention is to provide a fuel efficient design and method of operation of a rotary piston engine.

An additional object of a preferred embodiment of the present invention is to provide a low emission design and method of operation of a rotary piston engine.

Yet another object of a preferred embodiment of the present invention is to provide a high horsepower rotary piston engine design and method of operation.

A further object of a preferred embodiment of the present invention is to provide a high torque engine design and method of operation of a rotary piston engine.

Another object of a preferred embodiment of the present invention is to provide an improved port injected design and method of operation of a rotary engine.

An additional object of a preferred embodiment of the present invention is to provide an improved direct injected design and method of operation of a rotary engine.

Another object of a preferred embodiment of the present invention is to provide an improved computer controlled and variable method of management of a rotary engine.

Yet another object of a preferred embodiment of the present invention is to provide an improved rotary engine design and method of operation of a rotary engine featuring fully variable injector timing.

A further object of a preferred embodiment of the present invention is to provide an improved rotary engine design and method of operation of a rotary engine featuring fully variable injector timing as a function of the speed of the engine.

Another object of a preferred embodiment of the present invention is to provide an improved design and method of operation of a rotary engine that is capable of producing high performance at fuel to air ratios in excess of 15:1.

An additional object of a preferred embodiment of the present invention is to provide an improved design and method of operation of a rotary engine that is capable of producing high performance at fuel to air ratios in excess of 30:1.

Yet another of a preferred embodiment of the present invention is to provide an improved design and method of management of a rotary engine that produces high performance at high fuel to air ratios while maintaining exhaust temperatures at levels below 2000°.

A further object of a preferred embodiment of the present invention is to provide an improved design and method of management of a rotary engine that produces high performance at high fuel to air ratios while maintaining exhaust temperatures at levels below 2000°, even at high engine rpm levels.

Another object of a preferred embodiment of the present invention is to provide an improved design and method of management of a rotary engine that achieves lower emissions than prior known designs.

An additional object of a preferred embodiment of the present invention is to provide an improved design and method of management of a rotary engine that achieves reduced NOx emissions.

Yet another object of a preferred embodiment of the present invention is to provide an improved rotary engine design and method of operation that achieves high fuel economy.

A further object of a preferred embodiment of the present invention is to provide an improved rotary engine that provides a high horsepower to weight ratio relative to prior known designs.

Another object of a preferred embodiment of the present invention is to provide a small size engine design.

An additional object of a preferred embodiment of the present invention is to provide an improved rotary engine design and method of operation that provides improved data acquisition and display.

Yet another object of a preferred embodiment of the present invention is to provide an improved rotary engine design and method of operation that employs a side port exhaust.

A further object of a preferred embodiment of the present invention is to provide an improved rotary engine design that decreases or eliminates the amount of overlap between exhaust and intake by employing a side port exhaust.

Another object of a preferred embodiment of the present invention is to provide an improved rotary engine design that increases efficiency by employing side port exhaust.

An additional object of a preferred embodiment of the present invention is to provide an improved rotary engine design that increases efficiency through reduction of exchange of gasses between intake and exhaust by employing side port exhaust.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

BRIEF SUMMARY OF THE INVENTION

As embodied herein, the present invention is directed to an improved rotary engine. The rotary engine of the present invention has a rotor housing and a rotor disposed therein for planetary motion. The housing and the rotor cooperate to define a plurality of variable volume working chambers, each of which is moved along the inner peripheral surfaces of the housings and acts as the intake, compression, combustion-expansion, and exhaust chambers as the rotary planetary motion proceeds. The air intake ports may be formed in the side of the housing. The exhaust ports may also be formed in the side of the housing. The location of the exhaust port and the intake port in the side of the housing decreases the amount of exhaust overlap, and increases engine efficiency by reducing the amount of hot exhaust gas that is injected into the cylinder during the intake cycle.

In its simplest embodiment, the rotary engine of the present invention includes a housing and a rotor disposed within the housing. The housing, having a side portion and a peripheral portion, includes at least one intake port formed therein and at least one exhaust port formed therein. In one embodiment of the present invention, at least one exhaust port may be disposed in the side of said housing.

In another embodiment, the invention comprises a rotary piston internal combustion engine that comprises direct fuel injection with variable injector timing, to achieve fully stratified charge, at high air fuel ratios (preferably in excess of about 20:1), resulting in high fuel efficiency, while also achieving high horsepower and high torque over a wide range of engine rpm, and resulting in fewer hydrocarbon and reduced NOx emissions.

BRIEF DESCRIPTION OF THE DRAWINGS

FIG. 1 is a schematic elevation view of a cross section, illustrating one embodiment of the present invention comprising direct fuel injection.

FIGS. 2a through 2l are schematic elevation views of a cross section, illustrating the progression of a chamber of one embodiment of the present invention through the various stages of intake, compression, expansion, and exhaust.

FIG. 3 is a schematic elevation view of a cross section, illustrating a direct injected, gaseous fuel, rotary combustion engine of the type known prior to the present invention and disclosed in the '204 patent issued to King in 1992.

FIGS. 5a and 5b are a graph and table of data depicting representative rpm versus torque and horsepower curves of one embodiment of the present invention in a single rotor of a Mazda 13B turbo engine (654 cc).

DETAILED DESCRIPTION OF THE PREFERRED EMBODIMENTS

Figure 2A:
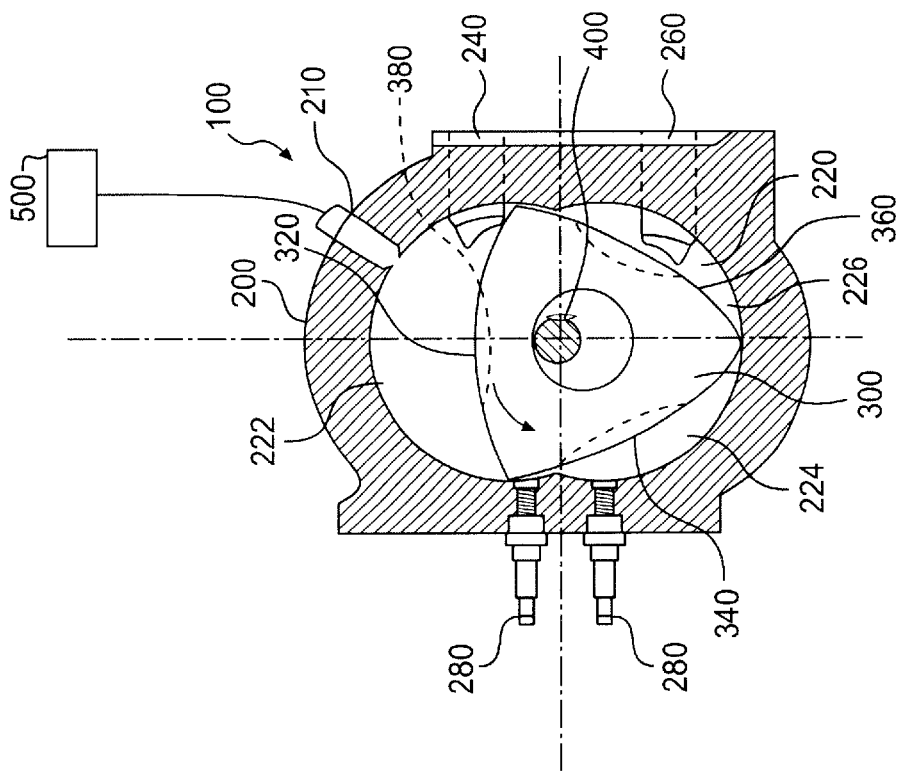

Reference will now be made in detail to a preferred embodiment of the improved rotary engine design and method of management, an example of which is illustrated in the accompanying drawings. A preferred embodiment of the present invention is shown in FIG. 1.

An embodiment of the improved rotary engine, and method of managing same, of the present invention is shown in FIG. 1 as 100. As embodied herein, the invention 100 comprises: housing 200, rotor 300, crankshaft 400, and controller 500.

Housing 200 further comprises: a chamber 220, one or more intake port(s) 240, one or more exhaust port(s) 260, and one or more ignition means 280. As shown in FIG. 1, rotor 300 divides chamber 220 into three chambers 222, 224, and 226. As shown in FIG. 1, chamber 222 is on intake, chamber 224 is on compression, and chamber 226 is on exhaust stroke. The invention also comprises fuel delivery means 210. As embodied herein, fuel delivery means may be a carburetor disposed upstream of intake port 240, a fuel injection means, or any suitable fuel delivery system.

In certain embodiments of the invention, rotor 300, further comprises an equilateral triangle having three faces 320, 340, and 360. Rotor 300 further comprises seals 310, and a recess 380, formed in the middle of each face 320, 340, and 360, to facilitate ignition of the fuel/air mixture. Rotor 300 is rotatable around crankshaft 400 within chamber 220 formed in housing 200. In the preferred embodiment of the present invention, each seal 310 separates the combustion chamber from the others. As rotor 300 turns, each seal 310 maintains continuous sliding contact with the concave inner surface of the chamber 220. In the preferred embodiment of the present invention, each seal 310 does not come into contact with any of intake port(s) 240 and exhaust port(s) 260.

Rotor 300 can be geared to various gear ratios relative to crankshaft. In certain embodiments of the present invention, such as in those embodiments comprising a modified Mazda 13B engine, the ratio of the inner dimension of rotor 300 to the outer dimension of crankshaft 400 is such that the crankshaft to rotor rotation ratio is 1.5:1. For example, when the crankshaft achieves a rotational speed of 6000 rpm, the rotor is spinning only 2000 rpm.

Controller 500 may be any of various engine control module control devices of the type well known in the automotive art.

As will be understood by persons of ordinary skill in the art, the above configuration is conventional of rotary piston engines. The present invention incorporates a number of improvements in this design, individually and in combination, such as unique combinations of design elements and a method of managing the engine, to achieve the benefits and objects of the invention. For example, the invention comprises a combination of features to achieve high performance, high fuel economy, and low emissions, relative to prior known designs. The invention also includes a method of monitoring and managing the engine performance. The inventor has found that it is possible, through these improvements, to improve dramatically the performance of the rotary piston engine.

It will be apparent to those skilled in the art that various modifications and variations can be made in the basic configuration of the engine and method of management of the present invention 100, without departing from the scope or spirit of the invention. For example, the air intake may be naturally aspirated or turbocharged. Various fuels may be employed, including but not limited to natural gas, diesel, kerosene, gasoline, aviation gas, racing fuel compositions, alcohol-based fuels, fuels with various additives, other fuel formulations, gaseous fuels, and unconventional fuels, such as hydrogen, with appropriate modifications of the engine. Fuel delivery means may be by way of a carburetor, trigger valves adapted to deliver fuel, or fuel injectors (either through the intake port or direct injection into the combustion chamber.) Various modifications may be made in the size, shape, and configuration of the housing 200 and rotor 300 to effect changes in the chambers. The intake and exhaust ports may be side or peripheral ports, as desired to achieve the objects of the invention. The size, shape, configuration, and placement of the intake and/or exhaust ports may be modified to better achieve the advantages of the invention. Ignition may be supplied by spark ignition, glow plug, electronic ignitor, or any other appropriate means. The configuration of the rotor 300 relative to the crankshaft 400 may be modified, as may the ratio of rotation of the crankshaft to the rotor. Various control regimes 500 may be employed to optimize the operation of the engine to various ends, such as power, performance, fuel economy, or emission control. Thus, it is intended that the present invention cover the modifications and variations of the invention provided they come within the scope of the appended claims and their equivalents.

Similarly, additional variations and modifications of the end uses to which the invention may be put will be apparent to persons of ordinary skill in the art. The applications to which the improved engine and method of management of the present invention may be employed may include: automotive; off-the-road truck and/or equipment; racing; marine; amphibious; aviation; hybrid vehicles; stationary power generation; backup power generation; portable power generation; remote power generation; electric replacement motors; fluid pumps; industrial; or any of a variety of other useful applications. Thus, it is intended that the present invention cover the modifications and variations of the invention provided they come within the scope of the appended claims and their equivalents.

In a preferred embodiment, the present invention comprises engine control means 500. Engine control means 500 comprises a programmable electronic control module of a type well known to the art. As embodied herein, controller 500 is preferably a Motorola HC 6833 engine control module (ECM) controller. Controller 500 is preferably configured to accomplish the timing control of the present invention. Persons of ordinary skill, equipped with the knowledge of the present invention, would find programming controller 500 to achieve the goals of the invention a matter of routine skill.

The present invention achieves superior performance relative to prior known engine designs. Table 1 depicts the performance of one rotor of a two rotor, turbocharged, stock Mazda 13B engine (654 cc) of the type that is available commercially prior to the present invention. The engine has been adapted to use some of the improvements of the present invention. As shown in Table 1, the present invention achieves superior performance at extremely low air/fuel ratios of about 15:1 to about 20:1.

TABLE 1

Performance of Single Rotor from a Mazda 13B Engine Using the Present Invention (650 cc)

| RPM | HP | Torque (ft. lb.) | Air/Fuel Ratio |
| --- | --- | --- | --- |
| 3500 | 63 | 80 | 11.0 |
| 4000 | 83 | 109 | 10.0 |
| 4500 | 104 | 122 | 14.5 |
| 5000 | 141 | 148 | 18.0 |
| 5500 | 173 | 165 | 16.8 |
| 6000 | 186 | 182 | 17.2 |
| 6500 | 191 | 154 | 19.7 |
| 7000 | 213 | 160 | 21.0 |
| 7500 | 239 | 167 | 19.3 |
| 8000 | 241 | 158 | 17.3 |

The present invention achieves the advantages and objects of the invention through a unique combination of design features and an improved method of managing the injector, intake, and/or exhaust timing of the engine.

As embodied herein, the invention comprises: housing 200, rotor 300, crankshaft 400, and controller 500. In a preferred embodiment of the present invention housing 200 further comprises: fuel injector means 210; chamber 220 formed between the faces of rotor 300 and the inner surface of housing 200, which in turn is divided into three chambers 222, 224, and 226, by rotor 300; intake means 240; exhaust means 260; and ignition means 280. As embodied herein, fuel injection means 210, is preferably a high-pressure fuel injection system of the type well known in the art. In a preferred embodiment of the present invention, fuel injection system 210, operates at pressures in excess of 900 psi and preferably in the range of 900 to 1200 psi. In a preferred embodiment of the present invention, intake 240 and exhaust 260 means are preferably variable port timing intake and exhaust means, under the management of controller 500 to optimize the performance of the engine. Additionally, intake 240 and exhaust 260 means may be configured and disposed at various locations in chamber 220, to enhance the performance of the invention. In one embodiment of the present invention, as shown in FIG. 1, exhaust means 260 may be disposed in the side portion of chamber 220. The location of exhaust means 260 in the side portion of chamber 220 decreases the amount of exhaust overlap and communication of exhaust gasses with chamber 220. Thus, the location of exhaust means 260 in the side portion of chamber 220 preferably increases the efficiency of the present invention by reduction of hot exhaust gas into the intake cycle.

Ignition means 280 is a spark ignition system of the type well-known in the automotive art, preferably subject to the control of controller 500, in order to optimize the timing of ignition to optimize engine performance under various operating conditions.

Figure 2B:
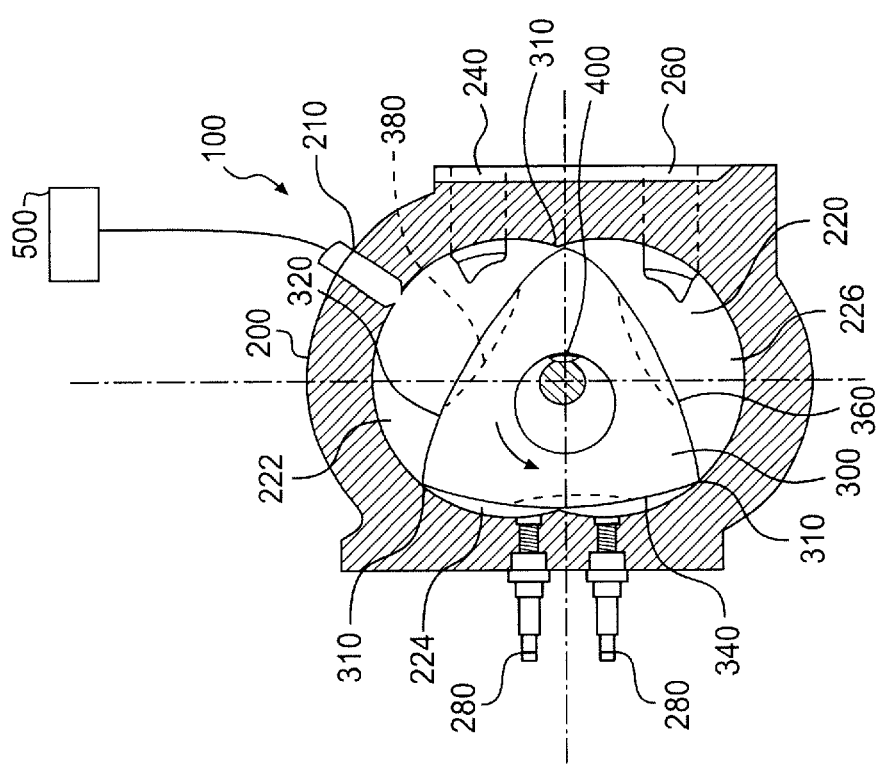
Figure 2C:
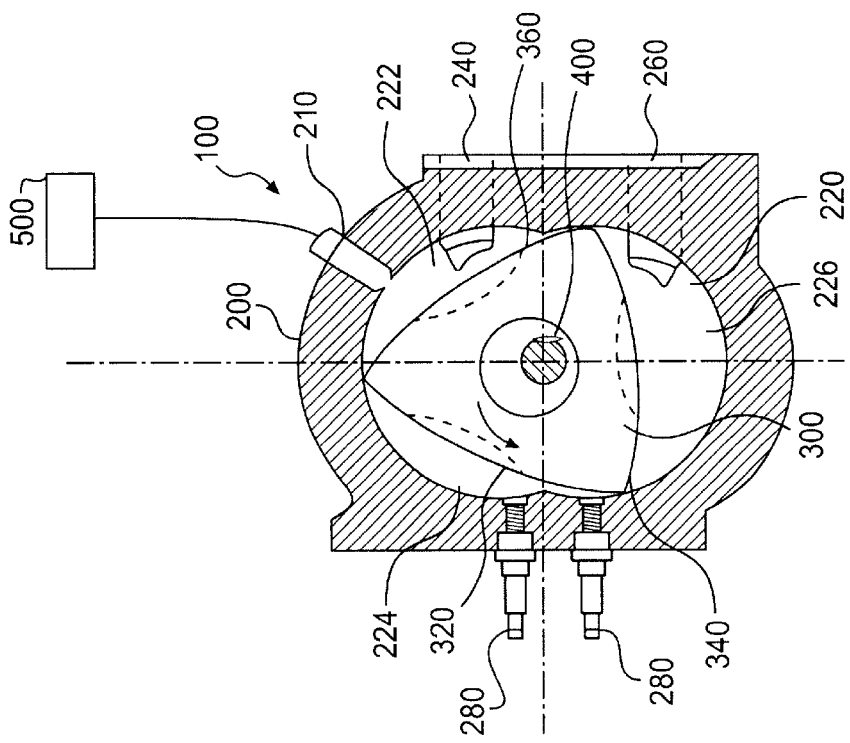
Figure 2D:
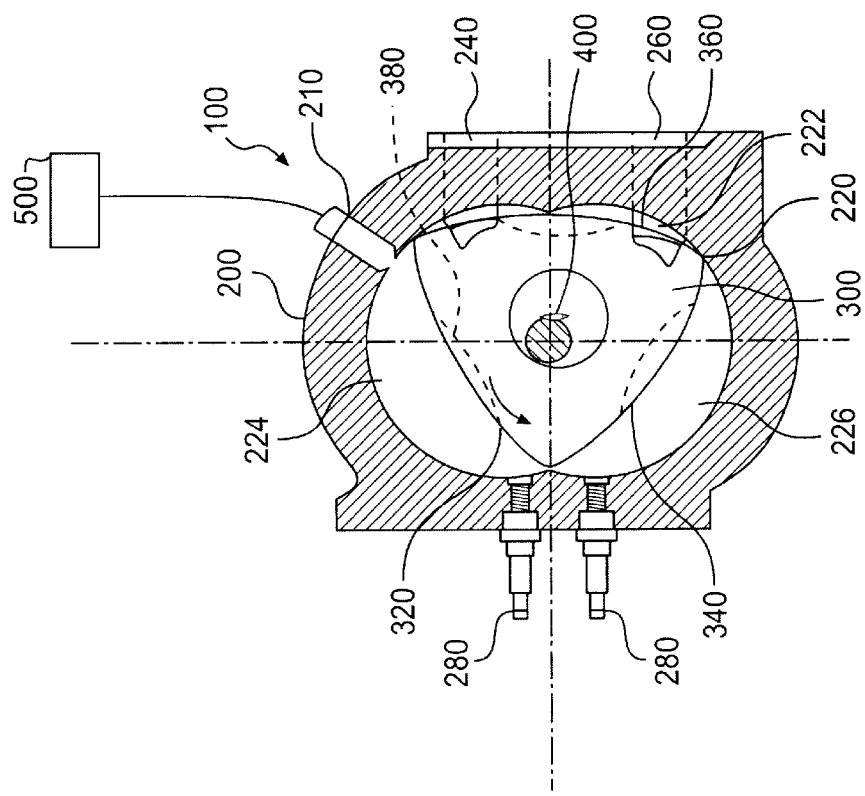
Figure 2G:
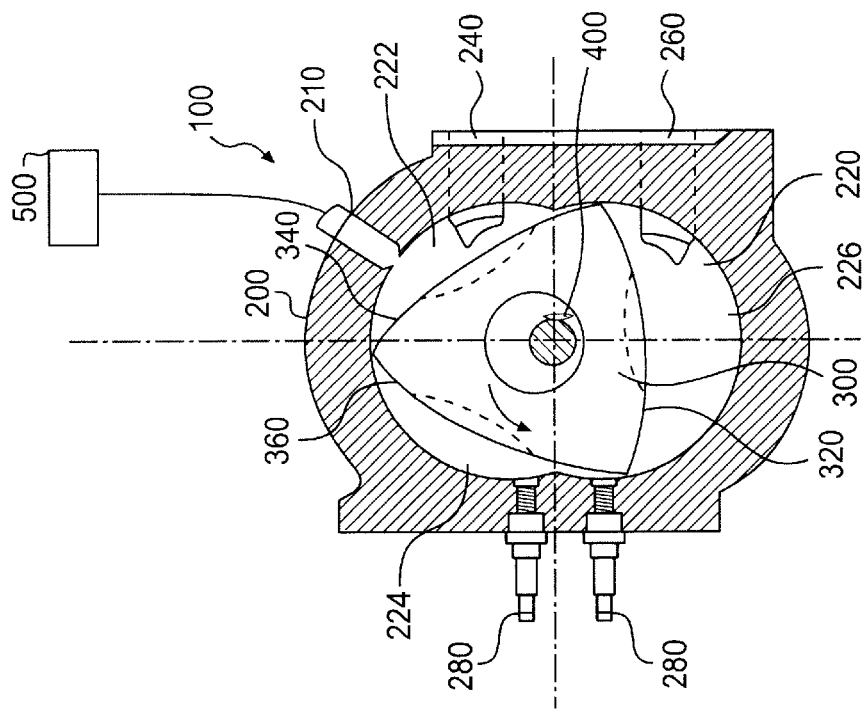
Figure 2H:
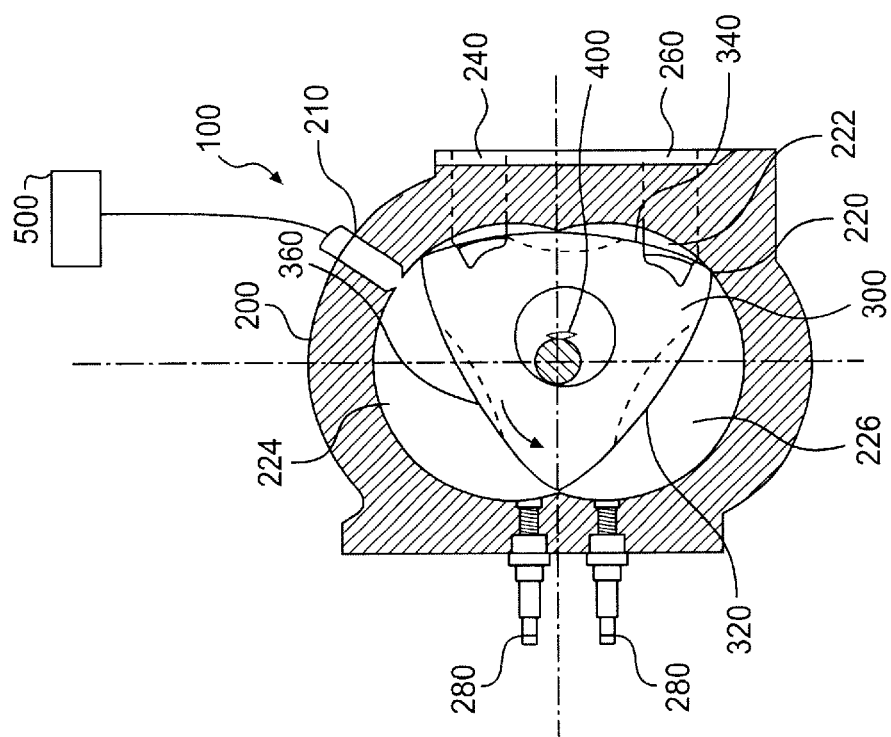
Figure 2K:
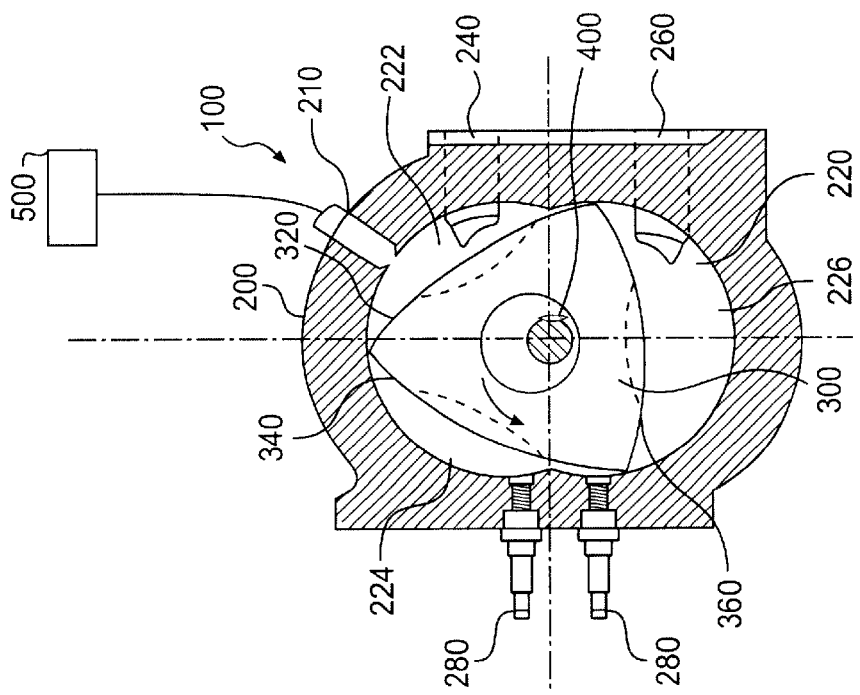
Figure 2L:
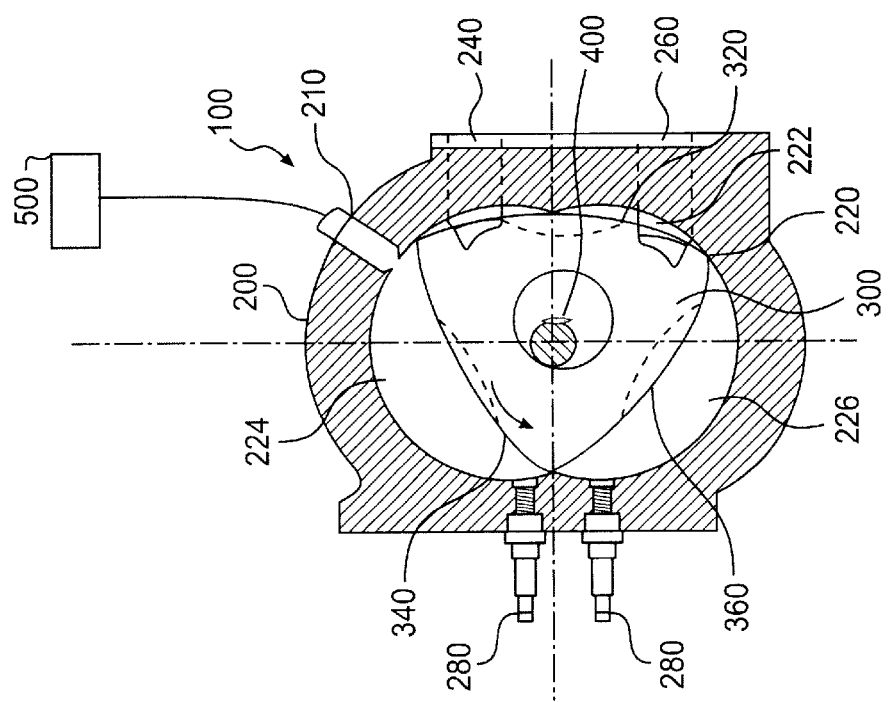

As shown in FIG. 2a and FIG. 2b, as rotor 300, revolves around crankshaft 400, within housing 200, rotor 300 draws air through intake port 240 into the chamber on intake 222. FIG. 2c depicts the rotor 300 as it has rotated to close the intake port, ending the intake stroke 222, and beginning the compression stroke 224. FIG. 2d depicts the progression of the compression stroke 224, which proceeds until the rotor reaches the position shown in FIG. 2e. At maximum compression, the chamber has reached its minimum volume and maximum compression pressure 224. As shown in FIGS. 2e and 2f, ignition means 280 is actuated, detonating the fuel air mixture and initiating the combustion stage 226. As shown in FIGS. 2f and 2g, rotor 300 continues its rotation around crankshaft 400 as the combustion gasses expand, delivering power to crankshaft 400. FIG. 2h depicts the exhaust stage 260, which continues as the rotor forces the exhaust gases out of the chamber as it decreases in size as shown in FIGS. 2i and 2j, until the end of the exhaust stroke 260 as shown in FIG. 2k. FIG. 2l depicts the beginning of the next intake stroke of the same face 320 of rotor 300. During the successive stages of intake, compression, expansion, and exhaust of each face of rotor 300, each of the other two faces of rotor 300, have also progressed through all four strokes, delivering three expansion strokes, for every rotation of rotor 300. In turn, rotor 300 has revolved around crankshaft 400 three times during each rotation of rotor 300.

This method of management of fuel injection results in this stratification of the fuel charge within the chamber. This stratification, in turn, results in an increase in power output due to more efficient burning. The result is increased thermal efficiency and increased power output, and, the present inventor believes, lowered hydrocarbon emissions and lowered NOx emissions.

In an alternate preferred embodiment of the present invention, the fuel injection trigger offset is initially set at 65° before bottom dead center. Controller 500 manages the injection cycle. This trigger offset point of 65° before bottom dead center preferably serves as the starting point for the fuel injector to turn on. Fuel injectors of the type known prior to the present invention typically employ a cycle in which the injector rapidly ramps up to a given flow rate, levels off for a period of time, and then abruptly shuts off.

The pulse width of the injection is measured in milliseconds. The present invention employs variable injection timing. Preferably the injector timing is varied as a function of engine speed. In an alternative preferred embodiment of the present invention, as the engine speed (rpm) increases, injector timing is advanced by an additional amount. This serves to maintain the injector cycle in an optimal, or at least appropriate, location during the intake stage of the cycle. The present invention preferably varies either the pulse width and/or injector timing to maintain the injection cycle in an optimum, or at least suitable, range to achieve the objects of the invention.

As the engine speeds up (to higher rpms) during a given number of milliseconds during which the injector remains open the piston will subtend a larger number of degree of rotation. The mathematical relationship between degrees and milliseconds is given by the value 0.006×rpm. For example, at 6,000 rpm, the crankshaft rotates 36° per millisecond. Table 2 depicts some preferred values of injection timing advance that the present inventor has found are useful in conjunction with the present invention.

TABLE 2

Injection Timing Advance as a Function of Engine Speed

| RPM | Degrees of Advance |
|---|---|
| 1,000 | 6 |
| 1,500 | 9 |
| 2,000 | 12 |
| 2,500 | 15 |
| 3,000 | 18 |
| 3,500 | 21 |
| 4,000 | 24 |
| 4,500 | 27 |
| 5,000 | 33 |
| 5,500 | 33 |
| 6,000 | 36 |

Applying this information to the present invention, if the injector starts an injection event at 65° before bottom dead center, when the intake port is just starting to close, as shown in FIG. 2b, the pulse width of the injector cannot be longer than the intake port timing (270°). If the pulse width is too long, the trailing edge of the rotor will pass the injector, resulting in fuel being sprayed onto the face of the rotor and injected into the next combustion chamber in the cycle. The present inventor has found, therefore, that it is preferable to end the injection event, at: (a) the point at which the intake port is closed; or (b) the point at which the trailing edge of the rotor passes or comes in proximity to the injector. In an alternative preferred embodiment, fuel injection preferably occurs at any time during the intake cycle, from when the leading edge apex seal of the combustion chamber passes the injector until when the trailing edge apex seal is in the proximity of, or passes, the injector, as shown in FIG. 2l. Injection timing is preferably advanced within this range, with increasing engine rpms, to maintain the injection event at an appropriate point and duration.

EXAMPLE

Figure 4A:
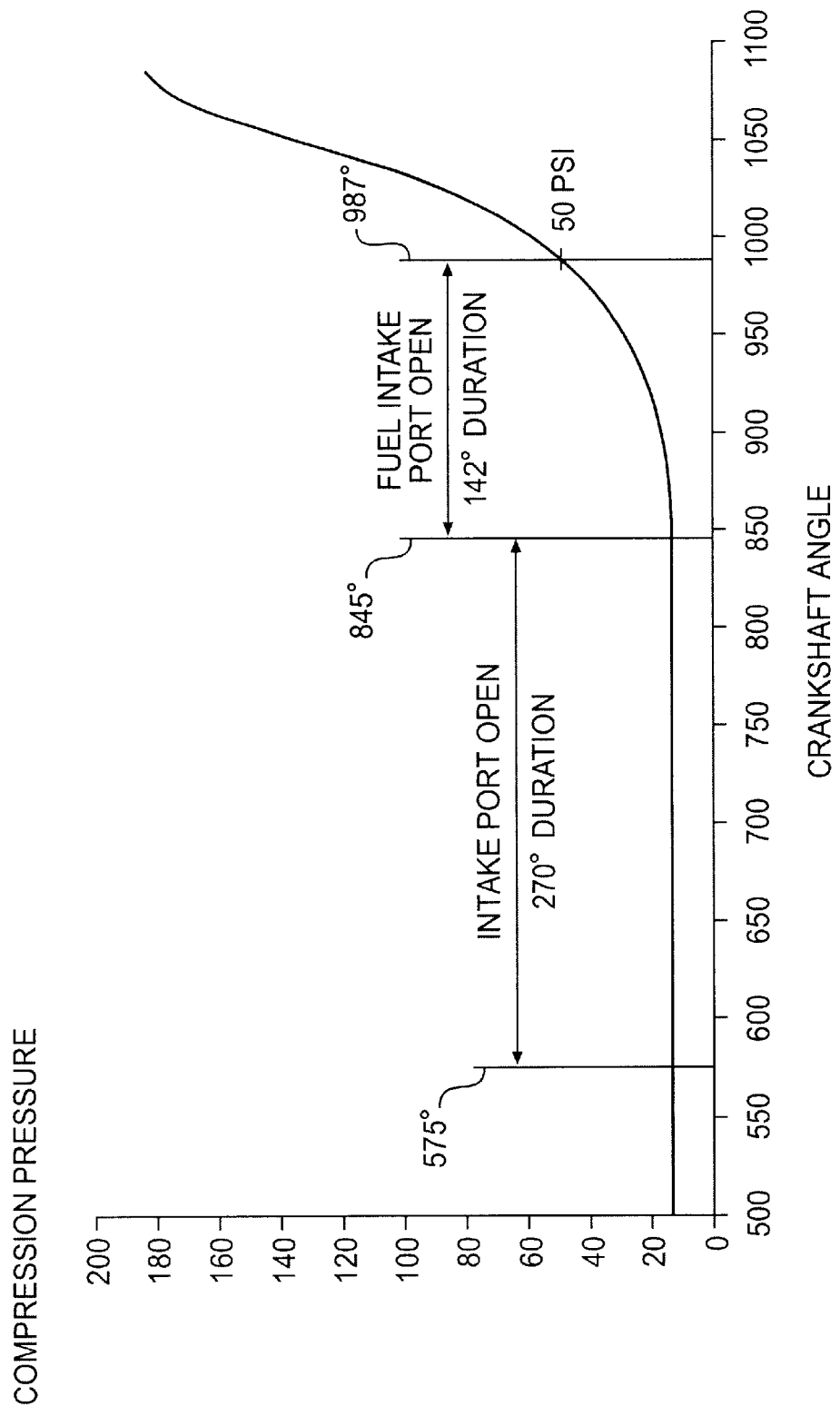
FIG. 4a is a chart depicting compression pressure versus crankshaft angle for the pressure in the working chamber calculated from computer simulations models and reported by King as the values during intake and compression strokes for the invention disclosed by King in his '204 patent.
Figure 4B:
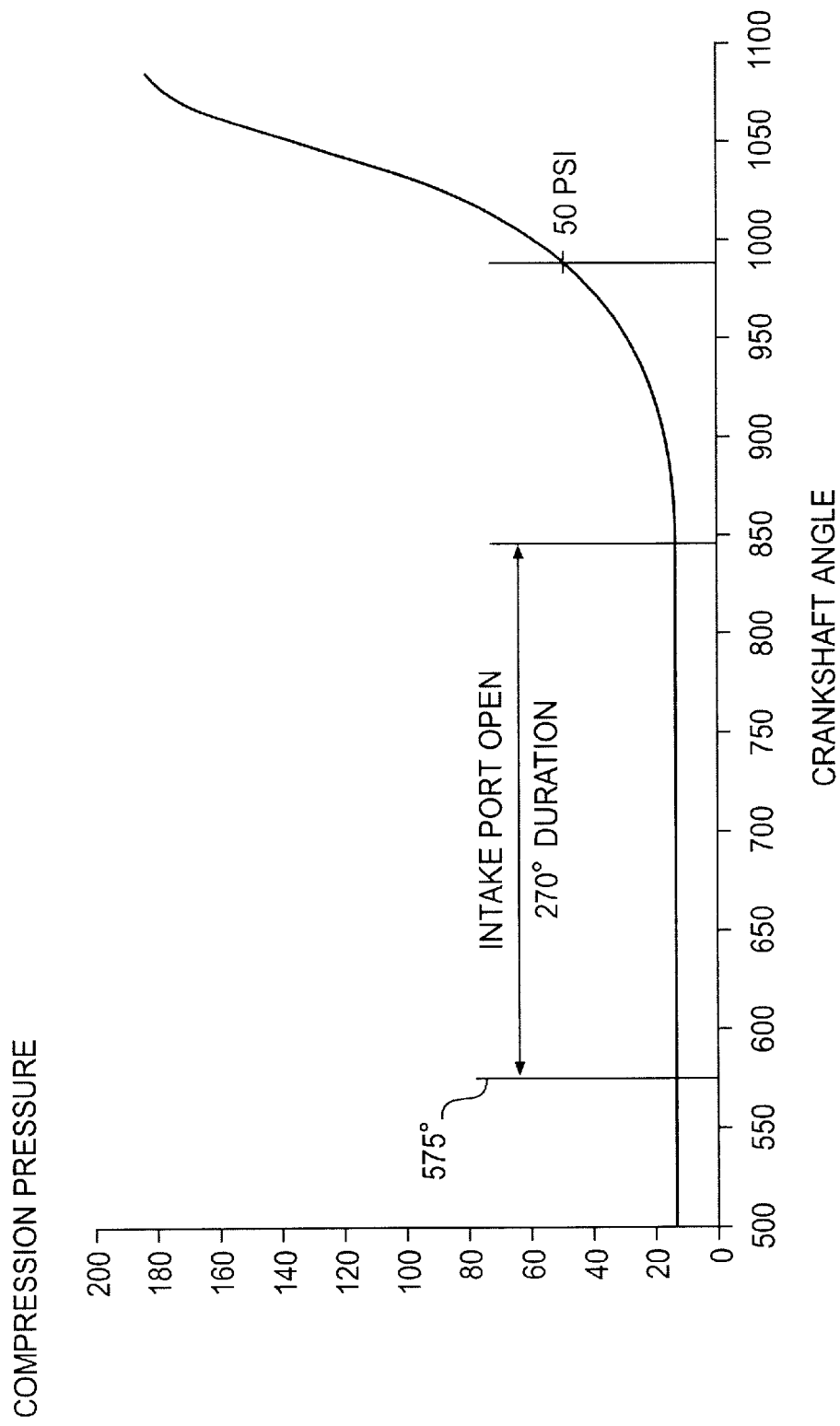
FIG. 4b is a chart depicting compression pressure versus crankshaft angle for the pressure in the working chamber based upon actual measurement of values in a test set up replicating the working conditions disclosed by King for a fuel injected gasoline engine.
Figure 5A:
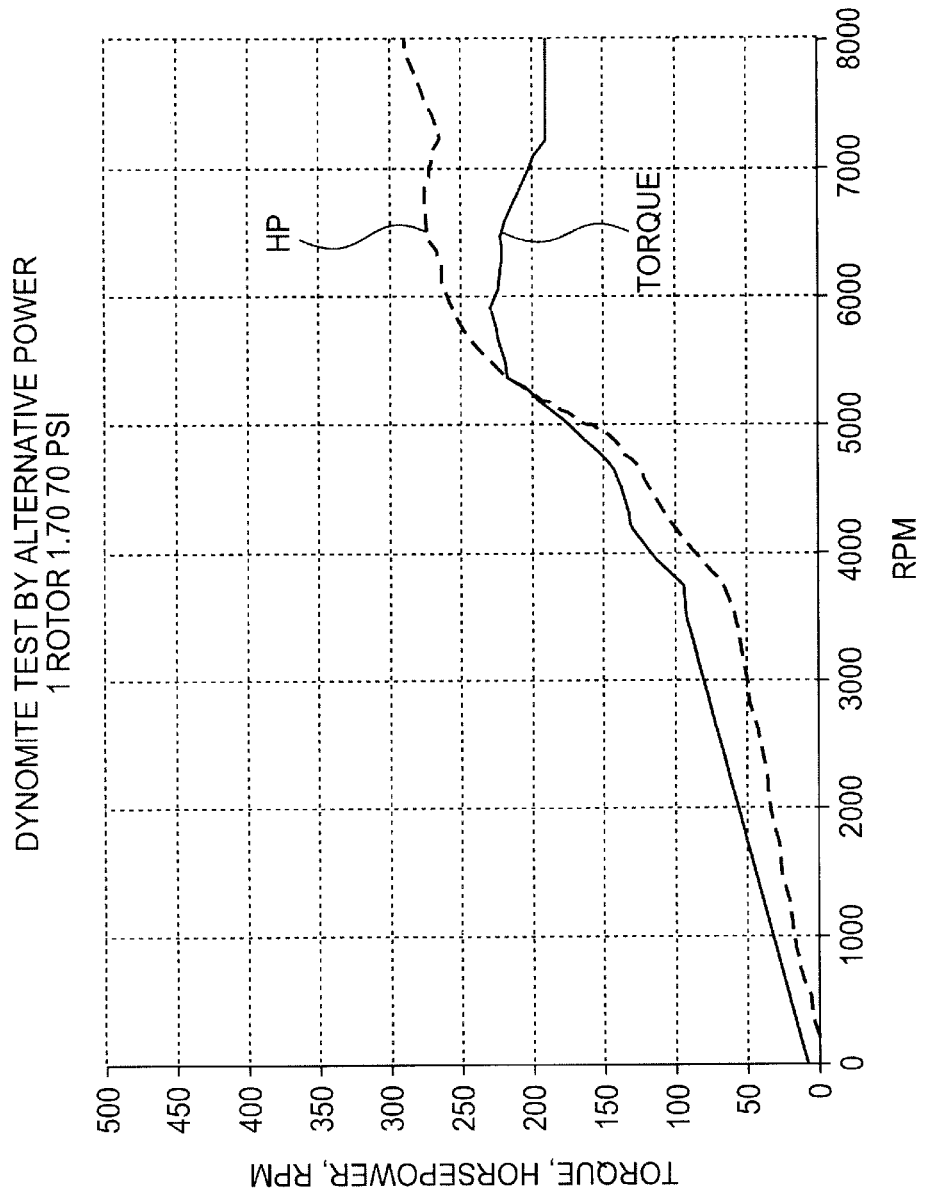

A single rotor of the type known prior to the present invention is managed using the method of the present invention to obtain superior performance. At 5,000 rpm, the rotor will subtend 30 degrees of crankshaft angle per millisecond, if the injector port remains open. (5,000 rpm× 0.006=30° per ms.) The intake timing, as shown in FIG. 4a, is typically 270°. The injection cycle, therefore, cannot be longer than 9 milliseconds (270° divided by 30°=9 ms.) The present invention preferably keeps the injector event within that window and, further, preferably as short as possible (for example, 2–4 ms.) This is accomplished by either further advancing the injector timing to maintain it within the intake window and/or shortening the pulse width of the injector event in order to maintain the injector event at the proper point in the cycle. Prior known methods of managing direct injected rotary engines have not disclosed and appear not to have recognized these features of the present invention. In the preferred embodiment, at 5000 rpm, the present inventor preferably uses a pulse width of approximately 4 ms of injection timing, or 120°.

The thermal efficiency of the engine bears out and supports the efficacy of the present invention. In prior known rotary engines, running at steady state, when the fuel mixture is made richer, the exhaust temperature typically falls. Similarly, when the exhaust mixture is made more lean, the exhaust temperature typically rises. Performance of the present invention, in contrast, runs counter to this prior conventional wisdom. In preferred embodiments of the present invention, the invention is run at steady state, the fuel is trimmed at zero, and the mixture is modified to make it richer by 20% or leaner by 20%. When the mixture is enriched by 20%, exhaust temperature in the present invention rises. When the mixture is leaned out by 20%, the exhaust temperature of the present invention falls. This result is consistent with achieving greater thermal efficiency and serves to support and bolster the efficacy of the invention and its differences in operation relative to prior known methods.

The present preferred embodiment of the invention has been to provide, by means of explanation, an example of the invention and does not limit the invention as claimed. It will be apparent to persons of ordinary skill in the art that various modifications and variations may be made in the engine and method of operation of the present invention, without departing from the invention as claimed. Thus, it is intended that the invention include all of these variations and modifications, provided they come within the scope of the appended claims and their equivalents.

What is claimed is:

1. A rotary engine with improved reliability, comprising:
    a housing, having side portions and a peripheral portion defining a chamber;
    a direct variable timing fuel injector;
    a rotor, disposed within said chamber; and
    at least one exhaust port in one of said side portions.

2. The rotary engine of claim 1, wherein at least one intake port is formed in said side portion of said housing.

3. The rotary engine of claim 1, wherein at least one intake port is formed in a periphery end portion of said housing.

4. A rotary engine, comprising:
    a housing, having an inner surface, and intake and exhaust ports;
    a direct variable timing electronic fuel injector;
    a crankshaft; and
    a rotor, rotatable within said housing and around said crankshaft, said rotor having at least one seal provided at the apex of said rotor, wherein said at least one seal maintains continuous sliding contact with said inner surface of said housing, and wherein said at least one seal does not contact said intake and exhaust ports.

5. A rotary engine, comprising:
    a housing, comprising intake and exhaust ports;
    a direct fuel injector;
    an ignitor;
    a crankshaft disposed within said housing;
    a rotor, rotatable within said housing and around said crankshaft, forming a chamber between said housing and said rotor; and
    an engine controller for monitoring the condition of the engine and controlling said fuel injector and said ignitor, wherein said controller is adapted to vary the timing of said fuel injector over an operating range of the engine.

6. The engine of claim 5, wherein said intake port is disposed in an end of said chamber.

7. The engine of claim 5, wherein said intake port is disposed in a side of said chamber.

8. The engine of claim 5, wherein said exhaust port is disposed in the end of said chamber.

9. The engine of claim 5, wherein said exhaust port is disposed in the side of said chamber.

10. The engine of claim 5, wherein said housing further comprises variable timing for said intake port.

11. The engine of claim 5, wherein said housing further comprises variable timing for said exhaust port.

12. The engine of claim 5, wherein, said engine further comprises turbocharger means cooperating with said intake port.

13. The engine of claim 5, wherein said engine further comprises a turbocharger cooperating with said intake port and said exhaust port.

14. The engine of claim 5, wherein said fuel delivery means comprises a carburetor.

15. The engine of claim 5, wherein said fuel delivery means comprises a fuel injector.

16. The engine of claim 5, wherein said fuel delivery means comprises a high-pressure fuel injection system providing fuel at a pressure in the range of 900 to 1200 psi.

17. The engine of claim 5, wherein said fuel delivery means comprises a variable timing fuel injector.

18. The engine of claim 5, wherein said ignition means comprises a spark ignition.

19. The engine of claim 5, wherein said engine comprises direct fuel injection.

20. The engine of claim 5, wherein the engine further comprises direct fuel injection and fully stratified charge.

21. The engine of claim 5, wherein the engine further comprises direct fuel injection, fully stratified charge, and variable injector timing.

22. An engine having one or more combustion chambers, intake and exhaust means, and combustion chamber means comprising:
    a fuel injector, for direct fuel injection; and
    means for modifying the timing of said fuel injection as a function of crankshaft speed between a first point corresponding to opening of intake means and a second point corresponding to combustion chamber means being in proximity to said fuel injector,
    wherein, the operation of said engine is optimized.

23. The engine of claim 22, wherein the engine comprises a rotary engine and said first point corresponds to a leading edge of the combustion chamber passing said fuel injector.

24. The engine of claim 22, wherein the engine comprises a rotary engine and said first point corresponds to the beginning of closing of the intake means.

25. A method of managing the fuel injection of a rotary engine comprising:

setting injector timing at a starting point;

modifying the injector timing as a function of the speed of the engine;

maintaining the injector pulse between a first point at which the intake port opens and a second point at which the trailing edge of the piston approaches proximity to the injector;

to increase performance of the engine at air/fuel ratios at or about in excess of 15:1.

26. The method of claim 25, wherein the first point corresponds to the beginning of closing of intake means.

27. The method of claim 25 in which timing of the injector starting point is advanced to enhance engine performance.

28. The method of claim 25 in which injector pulse width is retarded to enhance engine performance.

29. The method of claim 25 in which the injector pulse width is modified to enhance engine performance.

30. A rotary engine with improved reliability, comprising:

a housing, having side portions and a peripheral portion defining a chamber;

means for injecting fuel into said chamber;

a rotor, disposed within said chamber; and at least one exhaust port in one of said side portions.

31. A rotary engine, comprising:

a housing, having an inner surface, and means for intake to and exhaust from the engine;

means for injecting fuel into said engine;

a crankshaft; and a rotor, rotatable within said housing and around said crankshaft, said rotor having at least one seal provided at the apex of said rotor, wherein said at least one seal maintains continuous sliding contact with said inner surface of said housing, and wherein said at least one seal does not contact said means for intake to and exhaust from said engine.

32. A rotary engine, comprising:

a housing, comprising intake and exhaust ports;

means for injecting fuel into the engine;

means for igniting said fuel;

a crankshaft disposed within said housing;

a rotor, rotatable within said housing and around said crankshaft, forming a chamber between said housing and said rotor; and an engine controller for monitoring the condition of the engine and controlling said means for injecting fuel into the engine and said means for igniting said fuel, wherein said controller is adapted to vary electronically the timing of said means for injecting fuel over an operating range of the engine.

33. The engine of claim 32, wherein the engine further comprises direct electronic fuel injection, said means for injecting fuel is disposed between about 30 degrees and 180 degrees before top dead center of the crankshaft, and said controller is adapted to retard the timing of said fuel injection.

34. The engine of claim 32, wherein the engine further comprises direct electronic fuel injection, said means for injecting fuel is disposed between about 30 degrees and 180 degrees before top dead center of the crankshaft, and said controller is adapted to advance the timing of said fuel injection.

* * * * *